(12) United States Patent
Agarwala et al.

(10) Patent No.: US 8,103,121 B2
(45) Date of Patent: Jan. 24, 2012

(54) SYSTEMS AND METHODS FOR DETERMINATION OF A CAMERA IMPERFECTION FOR AN IMAGE

(75) Inventors: Aseem Agarwala, Seattle, WA (US);
Daniel R. Goldman, Seattle, WA (US);
Sujit Kuthirummal, New York, NY (US)

(73) Assignee: Adobe Systems Incorporated, San Jose, CA (US)

( * ) Notice: Subject to any disclaimer, the term of this patent is extended or adjusted under 35 U.S.C. 154(b) by 1050 days.

(21) Appl. No.: 11/944,056

(22) Filed: Nov. 21, 2007

(65) Prior Publication Data
US 2009/0060369 A1 Mar. 5, 2009

Related U.S. Application Data

(60) Provisional application No. 60/967,235, filed on Aug. 31, 2007.

(51) Int. Cl.
*G06K 9/40* (2006.01)
(52) U.S. Cl. ....... 382/275; 382/260; 382/274; 358/3.26; 358/3.27
(58) Field of Classification Search .................. 382/260, 382/274, 275; 358/3.26, 3.27, 463
See application file for complete search history.

(56) References Cited

U.S. PATENT DOCUMENTS

| | | | | |
|---|---|---|---|---|
| 5,987,164 A * | 11/1999 | Szeliski et al. | ................. | 382/154 |
| 6,097,854 A * | 8/2000 | Szeliski et al. | ................. | 382/284 |
| 6,411,371 B1 * | 6/2002 | Hinderling et al. | .......... | 356/4.01 |
| 6,545,749 B1 * | 4/2003 | Andersson | ................... | 356/5.01 |
| 6,833,909 B2 * | 12/2004 | Schmidt et al. | .............. | 356/4.01 |
| 6,919,892 B1 * | 7/2005 | Cheiky et al. | ................. | 345/473 |
| 7,088,865 B2 * | 8/2006 | Ejima et al. | .................... | 382/232 |
| 7,221,435 B2 * | 5/2007 | Stierle et al. | ................. | 356/4.01 |
| 2004/0041919 A1 | 3/2004 | Yamanaka | | |

FOREIGN PATENT DOCUMENTS

| | | |
|---|---|---|
| EP | 1 377 026 A2 | 1/2004 |
| EP | 1 377 026 A3 | 3/2004 |
| EP | 1 667 434 A1 | 6/2006 |
| WO | WO 2005/066893 A1 | 7/2005 |

OTHER PUBLICATIONS

International Search Report and Written Opinion mailed Oct. 29, 2008 in International Application Serial No. PCT/US2008/070986.
Alberto Ortiz and Gabriel Oliver, "Radiometric Calibration of CCD Sensors: Dark Current and Fixed Pattern Noise Estimation," Proceedings of the 2004 IEEE Internationl Conference on Robotics & Automation, New Orleans, LA, Apr. 2004.
Wonpil Yu, Yunkoo Chung and Jung Soh, "Vignetting Distortion Correction Method for High Quality Digital Imaging," Proceedings of the 17th International Conference on Pattern Recognition (ICPR'04).

(Continued)

*Primary Examiner* — Yosef Kassa
(74) *Attorney, Agent, or Firm* — Kilpatrick Townsend and Stockton LLP

(57) ABSTRACT

Methods and systems for creating an image filter is described. In one embodiment, a method includes receiving a first plurality of images captured by an at least one camera with a same setting as a first camera. The method further includes creating an averaged image from the plurality of captured images, wherein the averaged image comprises a measurement value of intensity for each pixel in the averaged image. The method also includes determining an image imperfection in the averaged image. The method further includes creating the image filter to reduce the image imperfection.

27 Claims, 12 Drawing Sheets

OTHER PUBLICATIONS

Dan B. Goldman and Jiun-Hung Chen "Vignette and Exposure Calibration and Compensation." Proceedings of ICCV '05. Beijing, China, Oct. 2005, pp. 899-906.

State Intellectual Property of the Peoples Republic of China, Office Action, Application No. 200880111405.5, Nov. 9, 2011.

* cited by examiner

SYSTEMS AND METHODS FOR DETERMINATION OF A CAMERA IMPERFECTION FOR AN IMAGE

CROSS-REFERENCE TO RELATED APPLICATION

This application claims priority to U.S. Provisional Patent Application No. 60/967,235 filed Aug. 31, 2007, entitled "Systems and Methods for Determination of Camera Distortion for an Image," the entirety of which is hereby incorporated by reference.

FIELD OF THE INVENTION

Embodiments of the present invention relate to systems and methods of determining and creating filters to reduce an image imperfection. In an embodiment, the present invention relates to automatic determination of a capture imperfection for a digital camera and automatic creation of a filter to correct such capture imperfection.

BACKGROUND

Digital cameras have become the preferred form of photography for the majority of people, from novice to advanced user alike. All cameras (analog and digital), though, have undesired imperfections through optical artifacts created by the lens or camera when capturing images. Example imperfections include vignetting (darkening in the corners of an image), radial distortion (curvature of the image towards the edges), and lens softness (where the camera does not capture a sharp image). Furthermore, some imperfections exist exclusively for digital cameras, including bad or dead pixels (e.g., improper capture of information at one point of a light sensor). For digital cameras, less expensive digital cameras tend to create more imperfections in captured images than more expensive models. Furthermore, imperfections are generally consistent across all cameras of a camera model or using a specific lens at specific settings. For example, most point-and-shoot camera models may have the same amount of vignetting for each camera with the lens at the same zoom setting.

Typically, to correct such imperfections in images captured by digital cameras, a professional would calibrate the digital camera so that the camera would compensate for the imperfections during capture of an image. Calibrating a camera, though, is typically a laborious and expensive process. In order to calibrate a camera, the professional is required to capture specific types of images (e.g., creating a perfect checkerboard pattern placed on a completely flat surface in order to capture 10-20 images from different positions around the checkerboard pattern) using expensive equipment (e.g., an integrating sphere to create perfect luminance in order to detect vignetting) in an extremely controlled test environment. In addition, once the images are created, the person calibrating must be skilled and intimately knowledgeable of the camera in order to calibrate the digital camera.

SUMMARY

Methods and systems for creating an image filter is described. In one embodiment, a method includes receiving a first plurality of images captured by an at least one camera with a same setting as a first camera. The method further includes creating an averaged image from the plurality of captured images, wherein the averaged image comprises a measurement value of intensity for each pixel in the averaged image. The method also includes determining an image imperfection in the averaged image. The method further includes creating the image filter to reduce the image imperfection.

This illustrative embodiment is mentioned not to limit or define the invention, but to provide examples to aid understanding thereof. Illustrative embodiments are discussed in the Detailed Description, and further description of the invention is provided there. Advantages offered by various embodiments of this invention may be further understood by examining this specification.

BRIEF DESCRIPTION OF THE DRAWINGS

These and other features, aspects, and advantages of the present invention are better understood when the following Detailed Description is read with reference to the accompanying drawings, wherein.

DETAILED DESCRIPTION OF PREFERRED EMBODIMENTS

Figure 1:
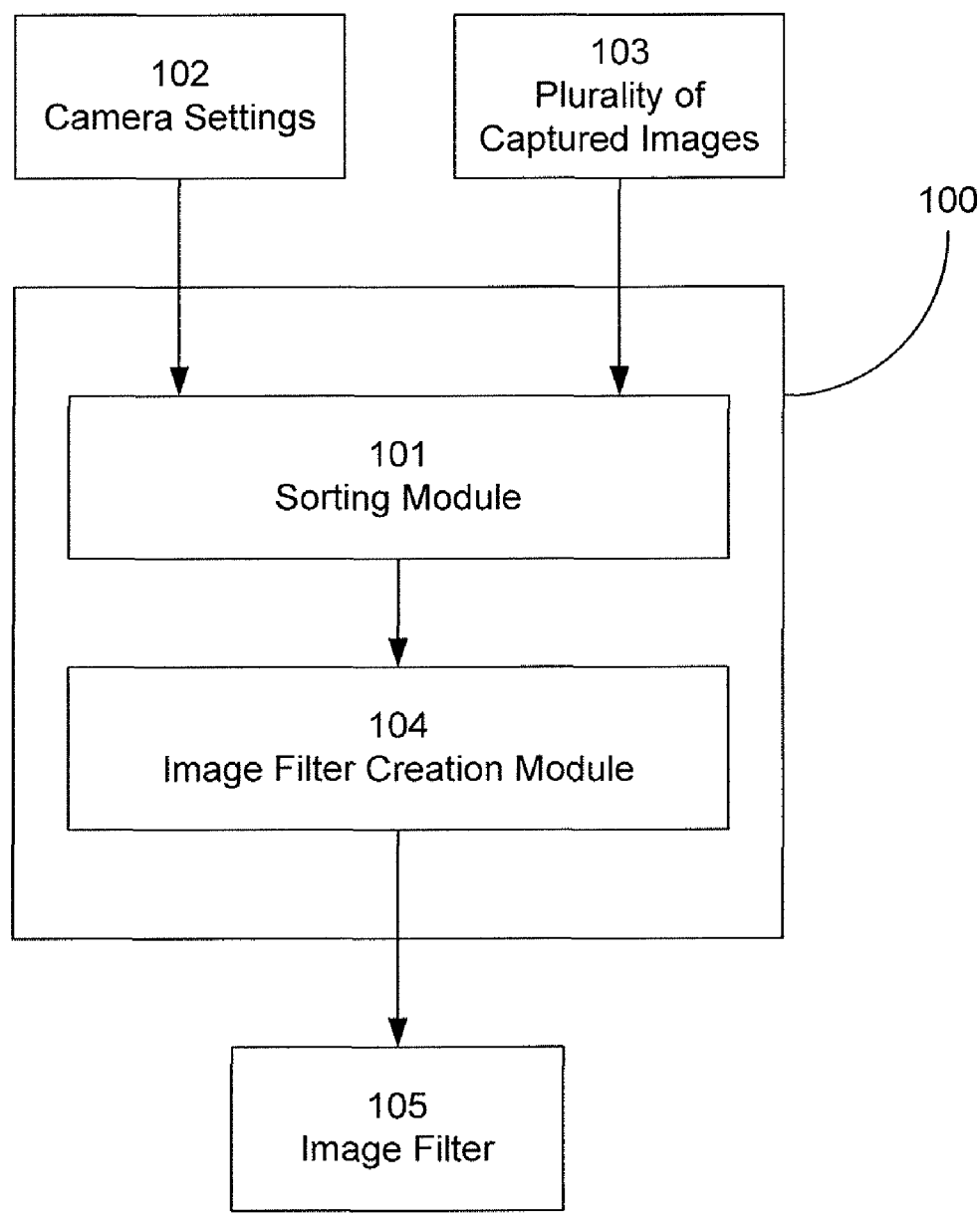
FIG. 1 shows an illustrative system 100 for determining an image imperfection and creating a filter.

Embodiments of the present invention relate to systems and methods of determining and creating a filter to reduce an image imperfection. In an embodiment, the present invention relates to automatic determination of a capture imperfection for a digital camera and automatic creation of a filter to correct such capture imperfection. Throughout the description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form to avoid obscuring the underlying principles of the present invention.

Image imperfections exist in most images taken by cameras today. Example imperfections that may exist in a digital image include, but are not limited to, vignetting, bad pixels, and radial distortion. Vignetting is the darkening of pixels related to the distance from the center of an image. Vignetting may be noticeable to the naked eye as dark corners of an image. Bad pixels are pixels of an image wherein the capture value for the pixel is incorrect. In one embodiment, the capture sensor for the pixel may malfunction or be damaged, thus causing incorrect values to be received. Bad pixels may be noticeable to the naked eye as a bright or dark point or where the colors of the point is not consistent with neighboring capture values. Radial distortion is the curvature of an image relative to distance from the center of the image. Radial distortion may be noticeable to the naked eye as curvature of supposed straight lines when approaching the edges of an image.

Digital photography allows manipulation of pixel values after capture in order to reduce imperfections in an image. Therefore, errors in a capturing system may be compensated for afterwards by a filter that alters pixel values to reduce such image imperfections. In one embodiment, an image imperfection (e.g., vignetting or a bad pixel) is determined and a filter is created in order to reduce the identified image imperfection.

In one embodiment, the specific camera settings are determined in order to determine an image imperfection and create a filter for the specific camera settings. For example, a first image is determined to be corrected for image imperfections. A camera with the same settings as another camera may have the same image imperfections. Specific camera settings include camera model, camera lens type, aperture size of the camera lens, and zoom setting of the camera lens. For point and shoot cameras, each camera of the same camera model has the same lens. Therefore, a plurality of images may be collected wherein the camera settings for the collected images equal the camera settings for the first image. In one embodiment, the images are collected from Flickr® or another source hosting a plurality of image.

In one embodiment, the camera settings may be determined from a header of the image. For example, an image may have an Exchangeable Image File (EXIF) header including the camera settings. Hence, each collected image has the same camera settings stored in its EXIF header. The plurality of collected images may then be combined into one image in order to determine an image imperfection. Once an image imperfection is determined from the one image, then a filter may be created from the identified image imperfection. The filter may then be applied to the first image in order to reduce an image imperfection.

Illustrative System for Identifying an Image Imperfection and Creating a Filter

FIG. 1 shows an illustrative system 100 for, in one embodiment, determining an image imperfection and creating a filter to reduce the image imperfection. In one embodiment, the system 100 generally comprises a sorting module 101 to receive a camera settings 102 for which an image imperfection is to be determined. The sorting module 101 may also receive a first plurality of images 103, thus reducing the first plurality of images into a second plurality of images wherein the camera settings of the images match camera settings 102 (e.g., same camera, aperture size, and zoom setting).

The system 100 may further comprise an image creation module 104 connected to the sorting module 101 in order to determine an image imperfection from the second plurality of images and create an image filter 105 from the identified image imperfection (e.g., vignetting, bad pixel, or radial distortion). The below described methods are example methods performed by the system 100 of FIG. 1 for identifying an image imperfection in order to create a filter to reduce the image imperfection.

Example Method for Determining an Image Imperfection and Creating a Filter

Figure 2:
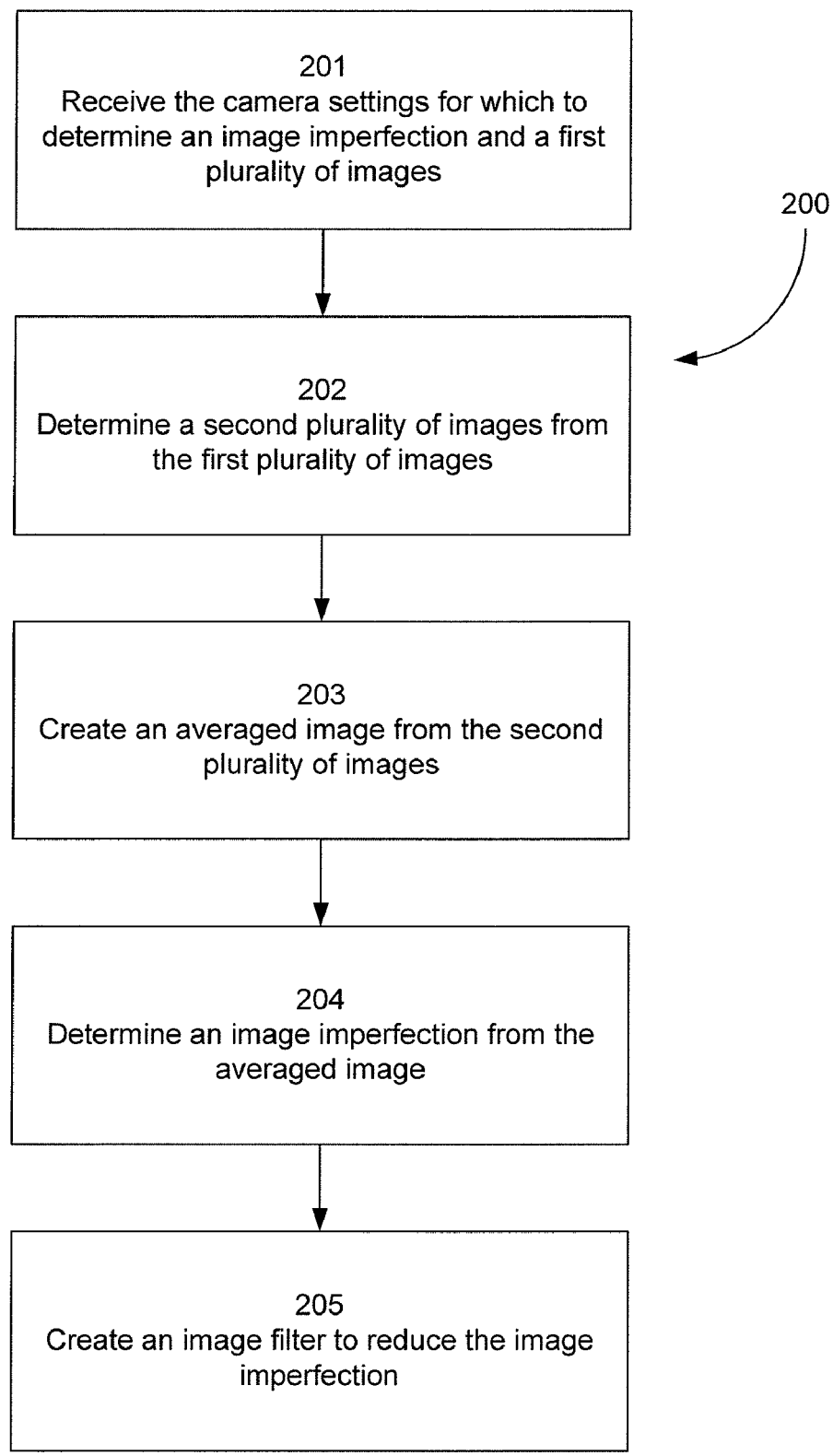
FIG. 2 illustrates an exemplary method 200 of the system 100 of FIG. 1 to determine an image imperfection and create a filter to reduce the image imperfection.

FIG. 2 illustrates an exemplary method 200 for determining an image imperfection and creating a filter to reduce the image imperfection. Beginning at 201, the sorting module 101 receives the camera settings for which to determine an image imperfection and a first plurality of pictures. The camera settings, in one embodiment, are the settings of a camera that captured a first image for which an image imperfection is to be determined and a filter created. For example, a user may wish to reduce the vignetting of a first image, wherein the first image is a JPEG captured by an Olympus® FE-120 Point and Shoot camera with a first aperture size and a zoom setting of 2×. As previously stated, images having the same camera settings (e.g., Olympus® FE-120, first aperture size, and 2× zoom setting) may exhibit the same image imperfections as the first image.

In one embodiment, receiving a first plurality of images is having access to a plurality of digital images. In one embodiment, the system 100 may be able to connect to image hosting sites (e.g., Flickr®) over the internet. In another embodiment, the system 100 may be able to receive a plurality of images captured by a user during casual photography that have been uploaded to the computer.

Proceeding to 202, the sorting module 101 determines a second plurality of images from the first plurality of images received in 201. The second plurality of images has the same camera settings as the received camera settings in 201 (e.g., Olympus® FE-120, first aperture size, and 2× zoom setting). Therefore, the images of the second plurality of images may exhibit the same camera imperfection(s) as the first image having the camera settings in 201.

Figure 3:
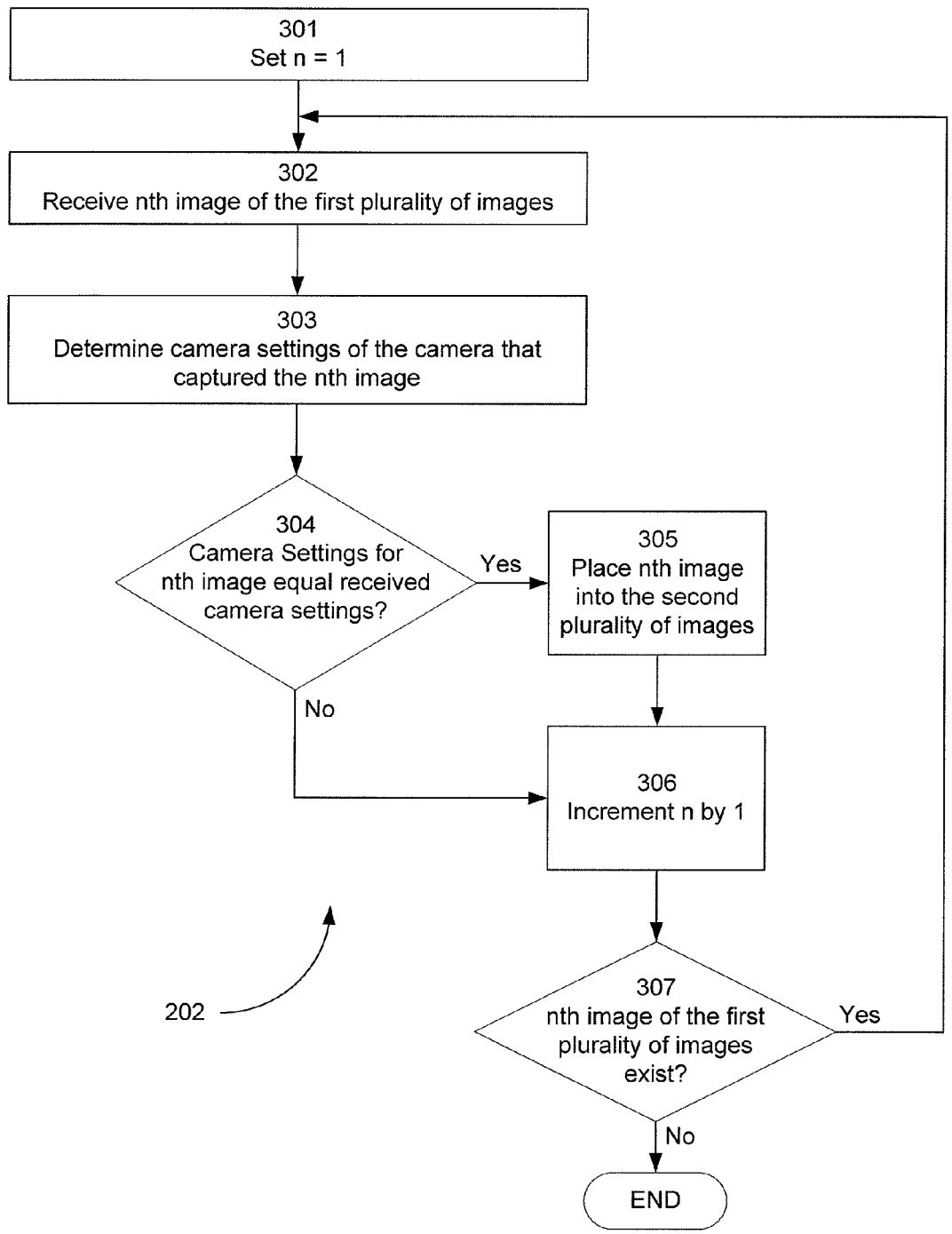
FIG. 3 illustrates an exemplary method 202 for determining a second plurality of images from the first plurality of images in FIG. 2.

FIG. 3 illustrates, in one embodiment, an exemplary method for determining the second plurality of images from the first plurality of images (202). Beginning at 301, a counter n to count through the images of the first plurality of images is set to one. Proceeding to 302, the nth image is pulled from the first plurality of images. For example, when n equals 1, the sorting module pulls the first image of the first plurality of images. Proceeding to 303, the sorting module 101 may determine the camera settings for the nth image. As previously stated, in one embodiment, the sorting module may read the EXIF header of the image in order to determine the camera settings. Proceeding to 304, the sorting module 101 may determine if the camera settings of the nth image equals the camera settings received in 201 if FIG. 2. For example, if imperfections are to be found in an image with the camera settings of Olympus® FE-120, first aperture size, and 2× zoom setting, then the sorting module determines if the camera settings of the nth image is Olympus® FE-120, first aperture size, and 2× zoom setting.

If the camera settings equal in 304, then the sorting module 101 places the nth image into the second plurality of images in 305 and increments the counter n by one in 306. If the camera settings do not equal in 304, then the sorting module 101 increments the counter n by one in 306, thus excluding the nth image from the second plurality of images. Upon incrementing the n counter, the sorting module determines if an nth image exists in the first plurality of images in 307. For example, if 10,000 images exist in the first plurality of images and the counter before increment in 306 equaled 10,000, then the sorting module 101 may determine if a 10,001$^{st}$ image exists in the first plurality of images.

If an nth image does not exist in the first plurality of images in 306, then process ends. For example, a 10,001$^{st}$ image does not exist in the previous example. Therefore, process ends in the previous example. If the nth image exists in the first plurality of images in 306, then process reverts to 302, and the nth image is analyzed by the sorting module 101 for camera settings 102.

In addition to comparing camera settings, in one embodiment, the sorting module 101 may exclude images from the second plurality of images based on orientation of the image and whether the image was taken with flash. For example, only landscape images captured without flash may be considered by the sorting module 101 to be included in the second plurality of images in order to create more consistent lighting parameters of the images (top-down from overhead lighting, whether artificial or the sun). In another embodiment, images that have been manipulated or saved by photo editing programs may also be excluded from the second plurality of images by the sorting module 101. An editor may alter an image such that the data does not accurately represent an image imperfection. Therefore, in one embodiment, the sorting module 101 reads the EXIF header in order to determine whether the image is manipulated by an editing program. In addition, the sorting module 101 may further exclude images not stored in full resolution for the camera setting or select images of a specific resolution.

Figure 4:
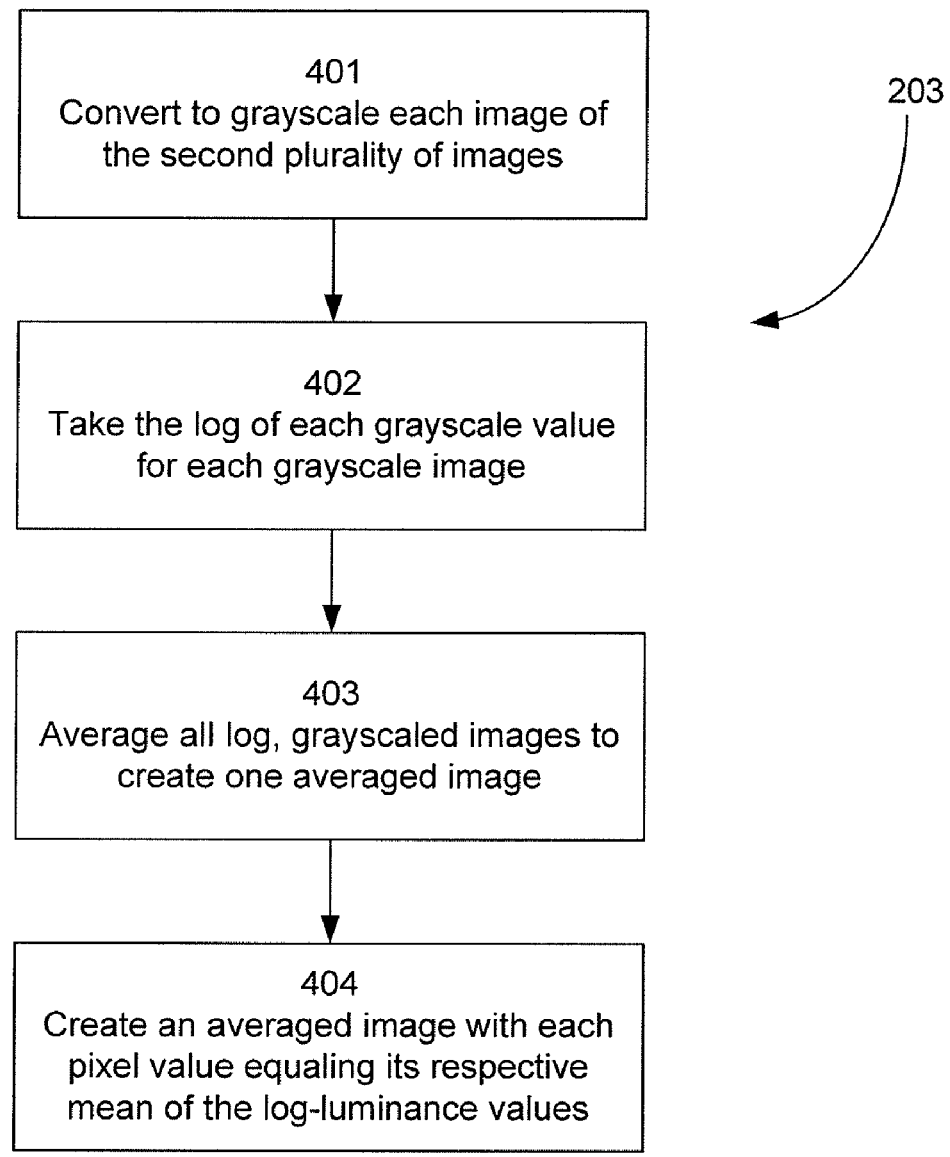
FIG. 4 illustrates an exemplary method 203 for creating an averaged image from the first plurality of average images in FIG. 2.

Referring back to FIG. 2, upon creating a second plurality of images in 202, the image filter creation module 104 receives the second plurality of images and creates an averaged image from the second plurality of images in 203. FIG. 4 shows an exemplary method for the image filter creation module 104 to create an averaged image from the second plurality of average images in 203 of FIG. 2. Beginning in 401, the image filter creation module 104 converts each image of the second plurality of images into grayscale. In one embodiment, the images may be color images, represented by RGB or LAB values for each pixel. Hence, the pixel gray value of an image may be a one value representation of the measurement of intensity of the pixel (e.g., luminance). Proceeding to 402, the logarithm of the luminance is calculated for each pixel by the image filter creation module 104.

Proceeding to 403, for each pixel position in an image, the image creation module 104 averages the log-luminance values for the pixel across all of the images in the second plurality of images. For example, the log-luminance values of the pixel at position (x,y) in each of the plurality of second images is averaged together. The image creation module 104 then creates an averaged image in 404, wherein the pixel value equals the mean log-luminance value for the pixel position in the second plurality of images. In one embodiment, the distribution of log-radiances for a pixel position is a normal distribution. Hence, the distribution of the log-radiance for each pixel may be characterized by the mean, as in the averaged image.

Figure 5:
FIG. 5 illustrates an example averaged image 500 from the exemplary method of FIG. 4.
Figure 6:
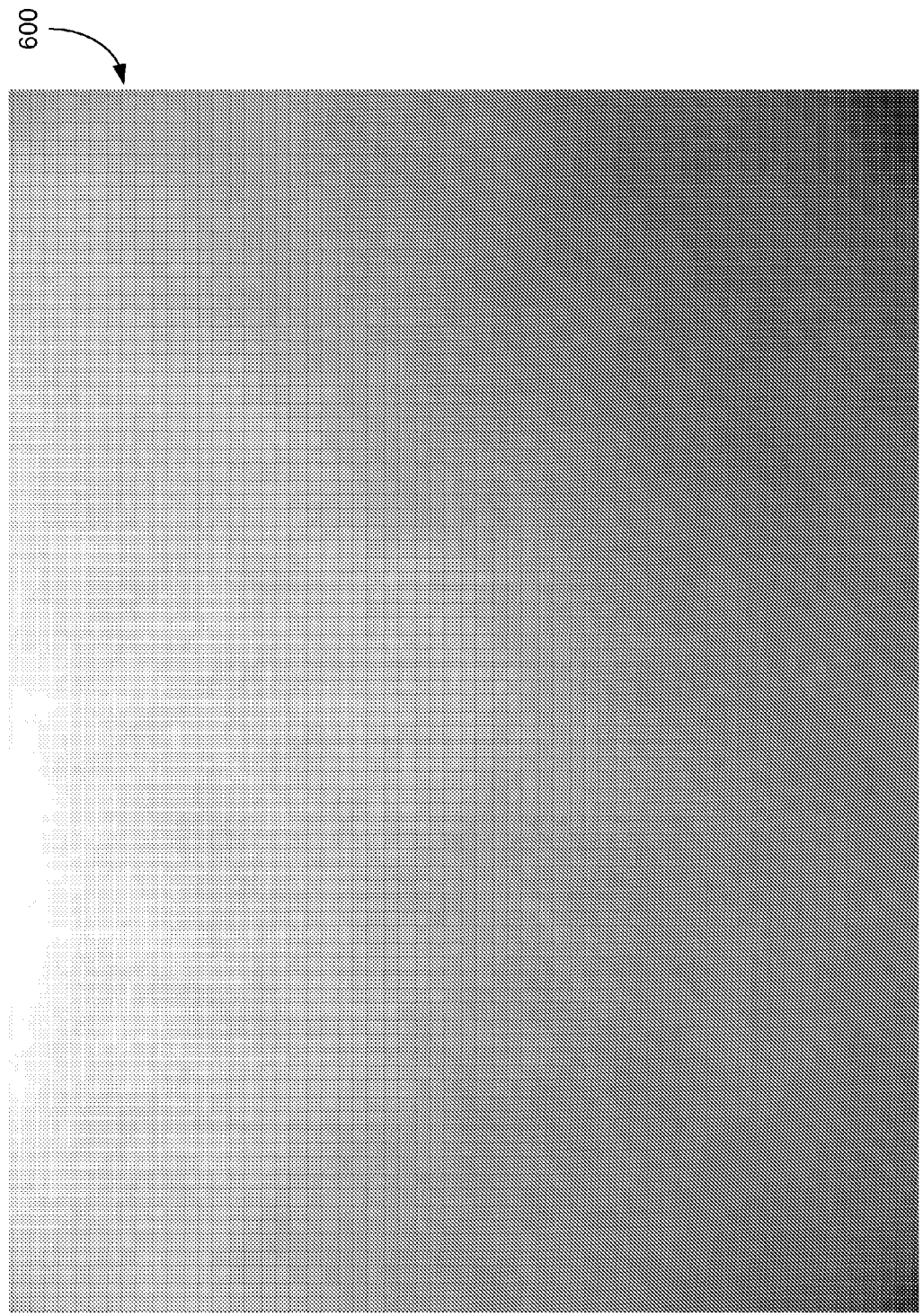
FIG. 6 illustrates an auto-leveled image 600 of the averaged image 500 in FIG. 5.

FIG. 5 illustrates an example averaged image 500 created by the method 203 of FIG. 4. FIG. 6 illustrates an auto-leveled image 600 of the averaged image 500 in FIG. 5. Image 600 allows the naked eye to notice vignetting associated with specific camera settings. For example, the corners of image 600 show darkening as compared to the rest of the image 600, signifying that vignetting is present in images having the same camera setting.

Referring back to FIG. 2, upon creating an averaged image, the image filter creation module 104 determines an image imperfection from the averaged image in 204. As previously stated, various image imperfections may be found, including bad pixels, vignetting, and radial distortion. The following description describes an example method for determining vignetting.

Determining Vignetting

Figure 7:
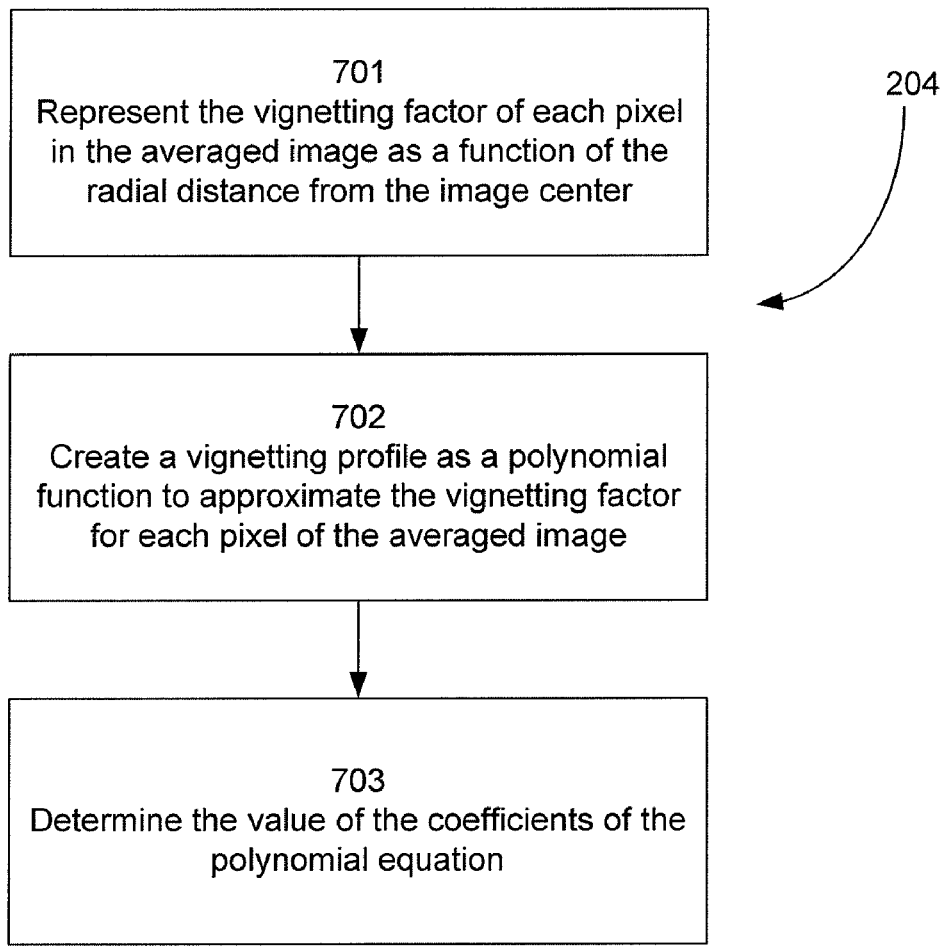
FIG. 7 illustrates an exemplary method 204 for determining an image imperfection from the averaged inage in FIG. 2, wherein the image imperfection is vignetting.

FIG. 7 illustrates an exemplary method for determining an image imperfection from the averaged image in 204 of FIG. 2, wherein the image imperfection is vignetting. As previously stated, vignetting is a radial distortion of luminance from the center of an image. Thus, if no vignetting exists, then luminance does not vary depending on distance from the center of an image. An averaged image with vignetting, though, typically darkens toward the corners of the averaged image (where the distance from the center of the image increases).

Beginning at 701, the image filter creation module 104 represent the vignetting factor of each pixel of the averaged image as a function of the radial distance from the image center. In one embodiment, a vignetting factor may be characterized by equation 1:

$$l_i(x,y)*v(r)=c_i(x,y) \tag{1}$$

where $l_i(x,y)$ is the luminance of the averaged pixel at position (x,y) if no vignetting exists. $c_i(x,y)$ is the luminance of the pixel in the presence of vignetting, v(r) is the vignetting factor for the pixel, i is the index into the second plurality of images, and r is the radial distance of the pixel from the center of the image.

Taking the logarithm of both sides of equation 1 yields equation 2 below:

$$\log(l_i(x,y)*v(r))=\log(c_i(x,y)) \tag{2}$$

which is mathematically equivalent to equation 3 below:

$$\log(l_i(x,y))+\log(v(r))=\log(c_i(x,y)) \tag{3}$$

As previously stated, the log-luminance at a pixel over many images with the same camera settings are normally distributed in one embodiment. Therefore, the distributions may be characterized by averaging the log-luminances of all images in the second plurality of images as displayed mathematically in equation 4 below:

$$\frac{1}{N}\sum_i \log(l_i(x,y)) + \log(v(r)) = \frac{1}{N}\sum_i \log(c_i(x,y)) \tag{4}$$

where N is the number of images in the second plurality of images. In one embodiment, each pixel value in the averaged image equals $$\frac{1}{N}\sum_i \log(c_i(x,y)).$$

For easier notation purposes, equation 4 may be rewritten as equation 5 below:

$$L(x,y)+V(r)=C(x,y) \tag{5}$$

where $L(x, y) = \frac{1}{N} \sum_t \log(l_1(x, y))$, $V(r) = \log(v(r))$, and $C(x, y) = \frac{1}{N} \sum_t \log(c_1(x, y))$.

In one embodiment, the log-luminance value of pixels along a row of an image equal in the absence of vignetting. Thus, equation 5 may be rewritten to remove the vertical aspect from L, as shown in equation 6 below:

$$L(y)+V(r)=C(x,y) \quad (6)$$

The averaged image represents the C(x,y) values for all x and y. L(y) represents the averaged image's log-luminance values for each row of the averaged image. V(r) is the vignetting profile of the averaged image, thus mapping the vignetting factor of each pixel in relation to the x and y values (position) of the pixel in the averaged image.

Referring back to FIG. 7, proceeding to 702, the image filter creation module 104 creates the vignetting profile as a polynomial function in order to approximate the vignetting factor for each pixel in the averaged image. As previously stated, V(r) is the vignetting profile. Therefore, making the vignetting profile a polynomial creates equation 7 below:

$$V(r) = \sum_{k=1}^{J} a_k r^k \text{ where } d \in N \quad (7)$$

where, $a_k$ is the coefficient of the monomial. A completed vignetting profile includes determined values for each of the coefficients of the monomial.

While the polynomial may be of any order (d being a natural number), smaller order polynomials may have larger errors in approximating vignetting factors, but larger order polynomials may require larger amounts of computing resources (e.g., processing power, memory, time). In one embodiment, the order of the polynomial is nine (d=9). Referring back to FIG. 7 and proceeding to 703, the image filter creation module 104 determines the value of the coefficients of the polynomial equation (vignetting profile). In one embodiment, with C(x,y) of equation 6 known from the averaged image and V(r) represented as a ninth power polynomial in equation 7, equation 6 may be reduced into a set of linear equations which may be solved for the coefficients of the polynomial (vignetting profile). Upon determining the coefficients in 703, the vignetting profile may approximate the vignetting factor for each pixel in an image having camera settings 102 (FIG. 1).

Figure 8:
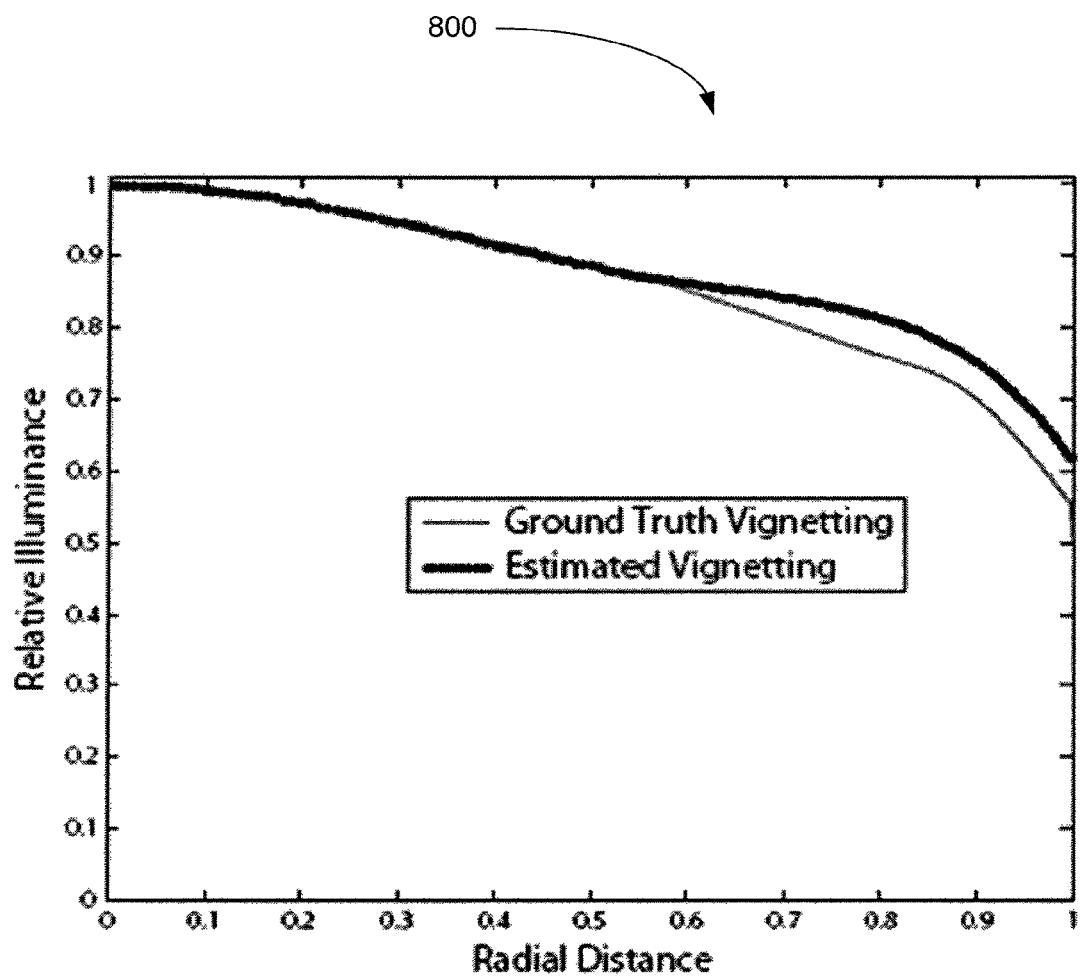
FIG. 8 illustrates an example graph 800 of an estimated vignetting profile compared to the actual vignetting profile of a camera with specific camera settings.

FIG. 8 illustrates an example graph 800 of an estimated vignetting profile compared to the actual vignetting profile for specific camera settings. The ground truth vignetting is the actual vignetting for an image and the estimated vignetting is what is derived from the vignetting profile. The error between the two lines may exist for multiple reasons, including too few images in the second plurality of images or saturated pixels in the averaged image. In one embodiment, the second plurality of images is greater than 10,000 images.

In one embodiment, the top center pixels of an averaged image are saturated (have a maximum value) because of high light intensities at those portions of the images. As a result, use of log-luminance values from those rows to solve for the coefficients may create additional error in the vignetting profile. Hence, in another embodiment of the invention, the vignetting profile is determined from the log-luminance values from the bottom half of the averaged image. In another embodiment, the image filter creation module 104 excludes a predetermined number of rows of the top of the averaged image in order to determine the coefficients of the vignetting profile.

Other than vignetting, the system 200 may also determine bad pixels, as described below.

Determining Bad Pixels

Figure 9:
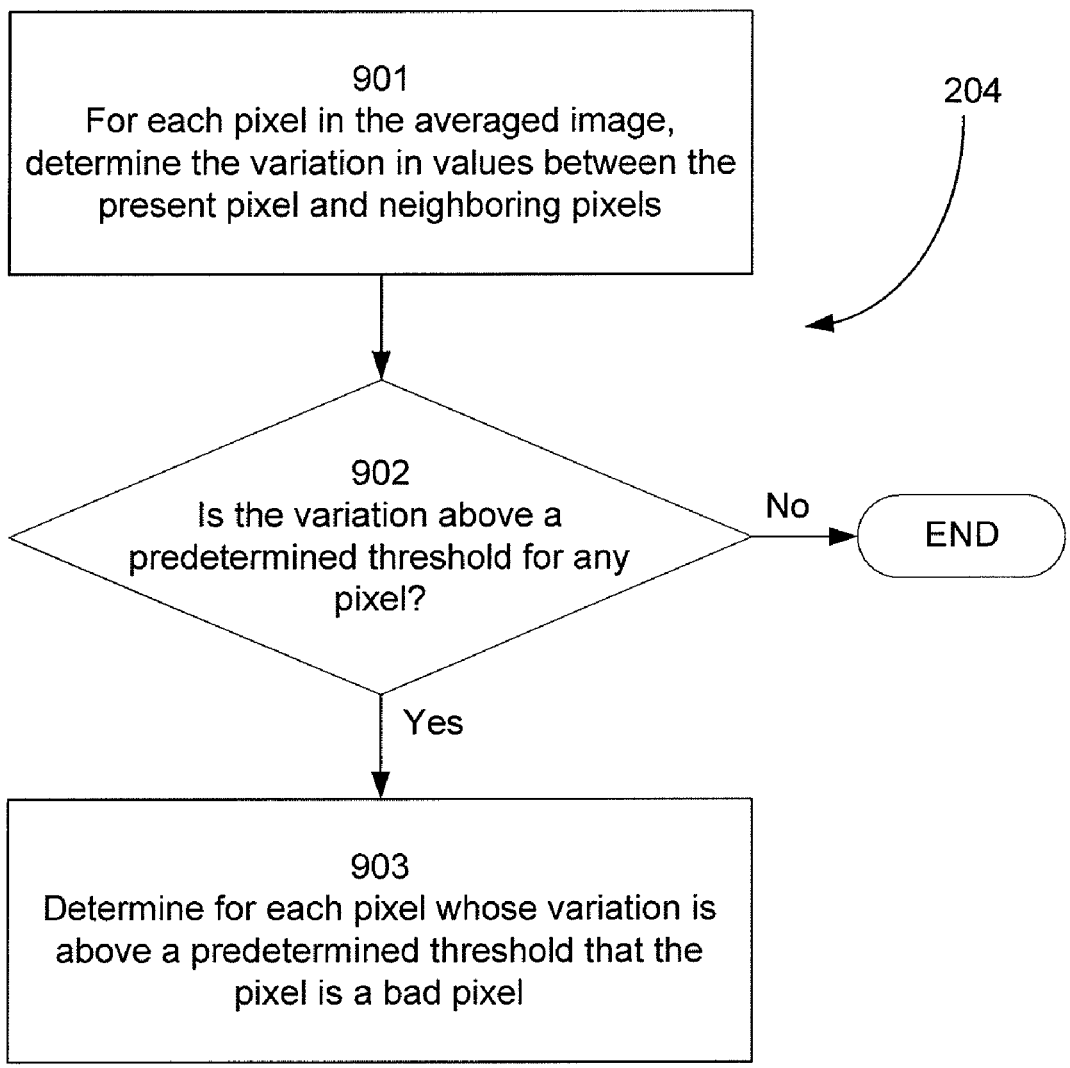
FIG. 9 illustrates an exemplary method 204 for determining an image imperfection from the averaged image in FIG. 2, wherein the image imperfection is a bad pixel.

FIG. 9 illustrates an exemplary method for determining an image imperfection from the averaged image in 204 of FIG. 2, wherein the image imperfection is a bad pixel. Beginning at 901, the variation in the log-luminance of a pixel and its neighbors is determined for the pixels in the averaged image by the image filter creation module 104. Proceeding to 902, the image filter creation module 104 determines is any of the calculated variations in 901 is above a predetermined threshold. For example, in one embodiment, for three horizontal neighbor pixels of the averaged image, the log-luminance does not vary by a large amount from the first pixel to the second pixel and then the second pixel to the third pixel. A large variation may indicate that the second pixel is a bad pixel. Hence, in one embodiment, if the variation of neighbor pixels is above a predetermined threshold in 902, then the image filter creation module 104 determines that the pixel is a bad pixel in 903.

Figure 10:
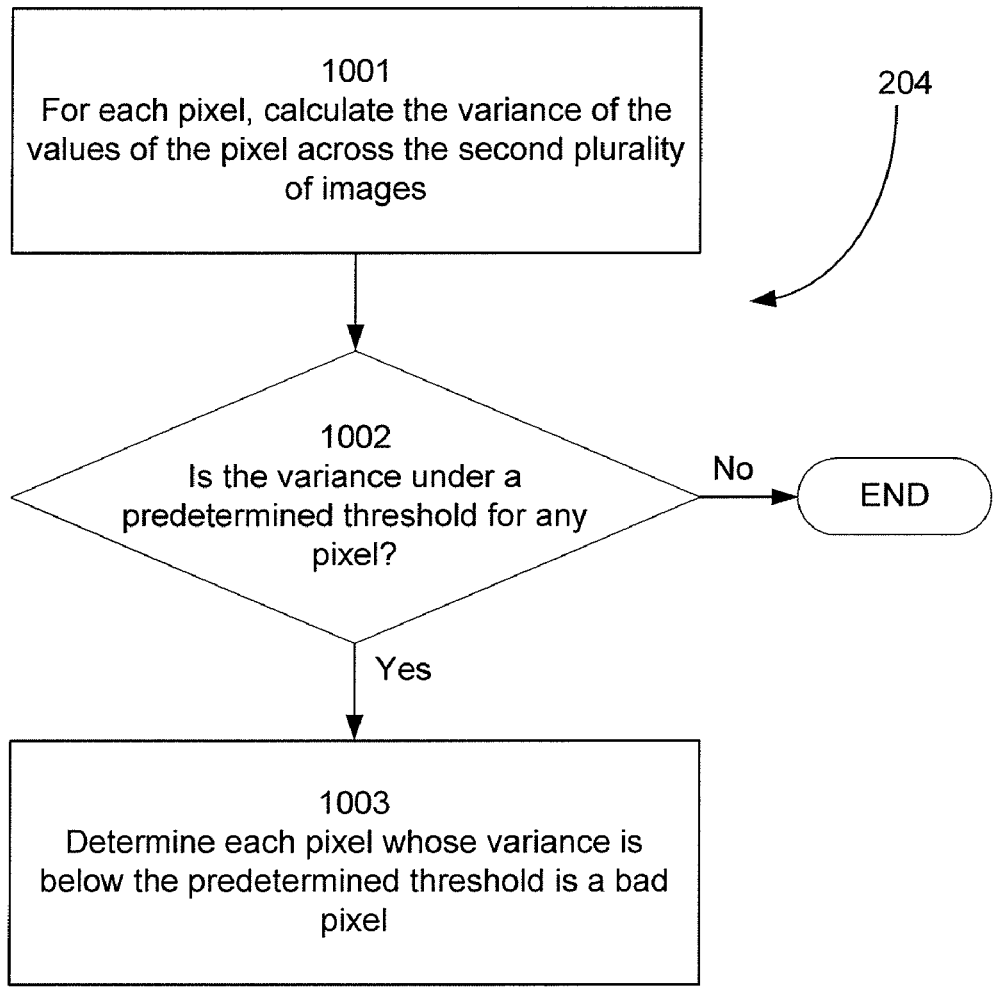
FIG. 10 illustrates an example method 204 for determining an image imperfection from the averaged image in FIG. 2, wherein the image imperfection is a bad pixel.

FIG. 10 illustrates another example method for determining an image imperfection from the averaged image in 204 of FIG. 2, wherein the image imperfection is a bad pixel. Beginning in 1001, the image filter creation module 104 determines for each pixel position the variance of the log-luminance value of the pixel across all of the second plurality of images. Proceeding to 1002, the image filter creation module 104 then determines for each pixel position if the variance is below a predetermined threshold.

A small variance may mean that the luminance value of the pixel does not fluctuate as much as is typical. As a result, the pixel is not the correct value and is a bad pixel. Therefore, comparing the variance of the log-luminance for a pixel to a predetermined threshold may determine when the variance is too small for a pixel. If a variance is below the threshold in 1002, then the image filter creation module 104 determines that the pixel is a bad pixel in 1003. If no variances are below the threshold in 1002, then no pixels are determined as bad pixels and process ends.

Figure 11:
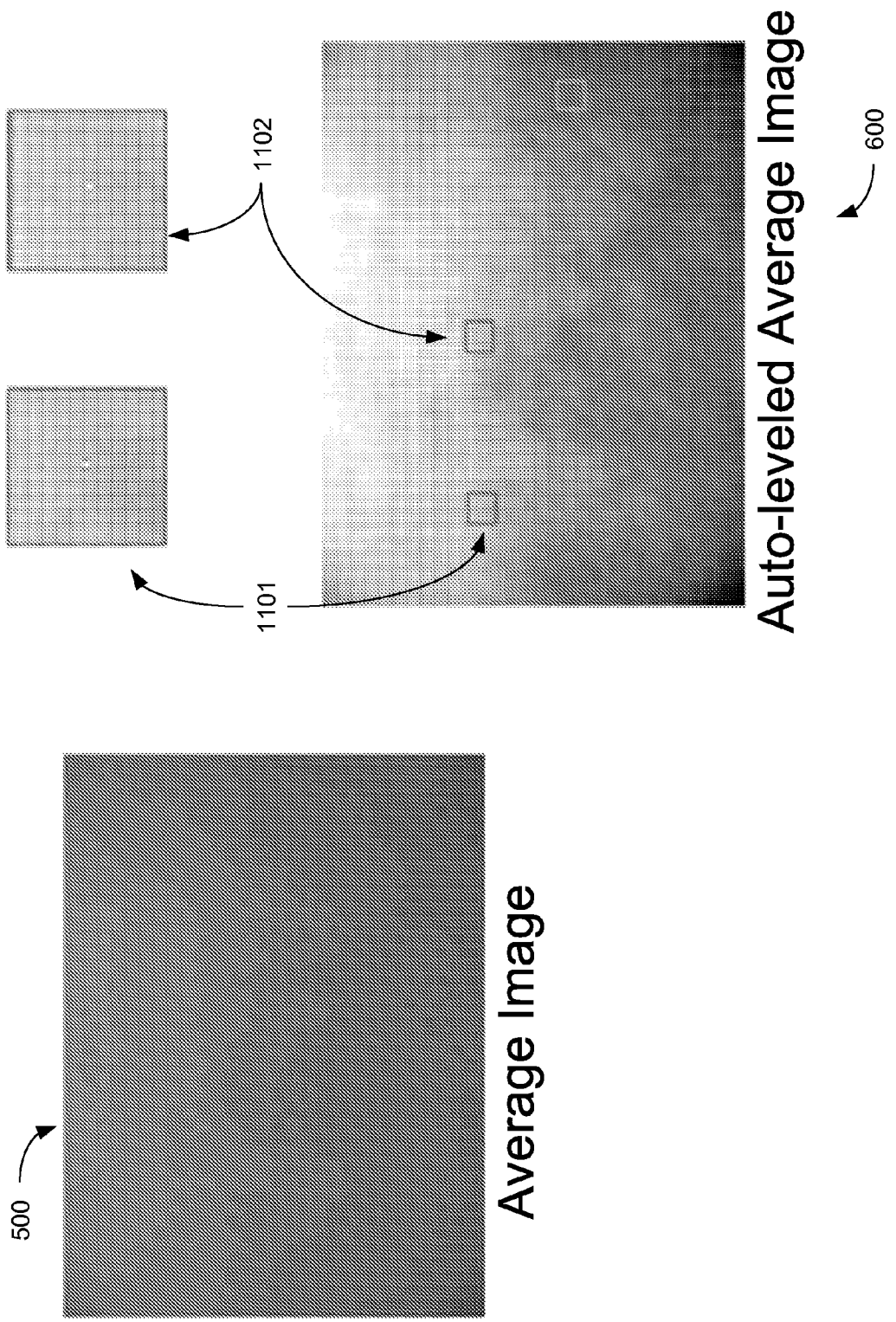
FIG. 11 illustrates the bad pixels of example averaged image in FIG. 5.

FIG. 11 illustrates bad pixels 1101 and 1102 in the example averaged image 500 of FIG. 5. The auto-leveled image 600 allows the naked eye to notice the luminance variation between the bad pixel and neighboring pixels.

In one embodiment, each bad pixel value may be replaced with an average of neighboring pixel values. For example. a 3×3 doughnut filter may average neighboring pixel values together and set the mask's center pixel value equal to the result of the mask.

Creating the Filter

Referring back to FIG. 2, upon determining the image imperfection in 204, the image filter creation module 104 creates an image filter 105 in 205 to reduce the image imperfection in an image having camera settings 102. In one embodiment, the image filter 105 to reduce vignetting includes the estimated vignetting profile in order to compute the vignetting factor and divide the pixel value by the computed vignetting factor for the pixel's position. In another embodiment, to reduce bad pixels, the filter 105 identifies the bad pixels and replaces the bad pixel values with an average of neighboring pixel values of the bad pixel. For example, a 3×3 doughnut filter may average neighboring pixel values together and set the mask's center pixel value (i.e., the bad pixel value) equal to the result of the mask.

In one embodiment, the image filter 105 may be saved into a filter bank or recomputed each time an image is to be filtered. In one embodiment, the image filter 105 may incorporate one image imperfection or multiple image imperfections.

Exemplary Computer Architecture

Figure 12:
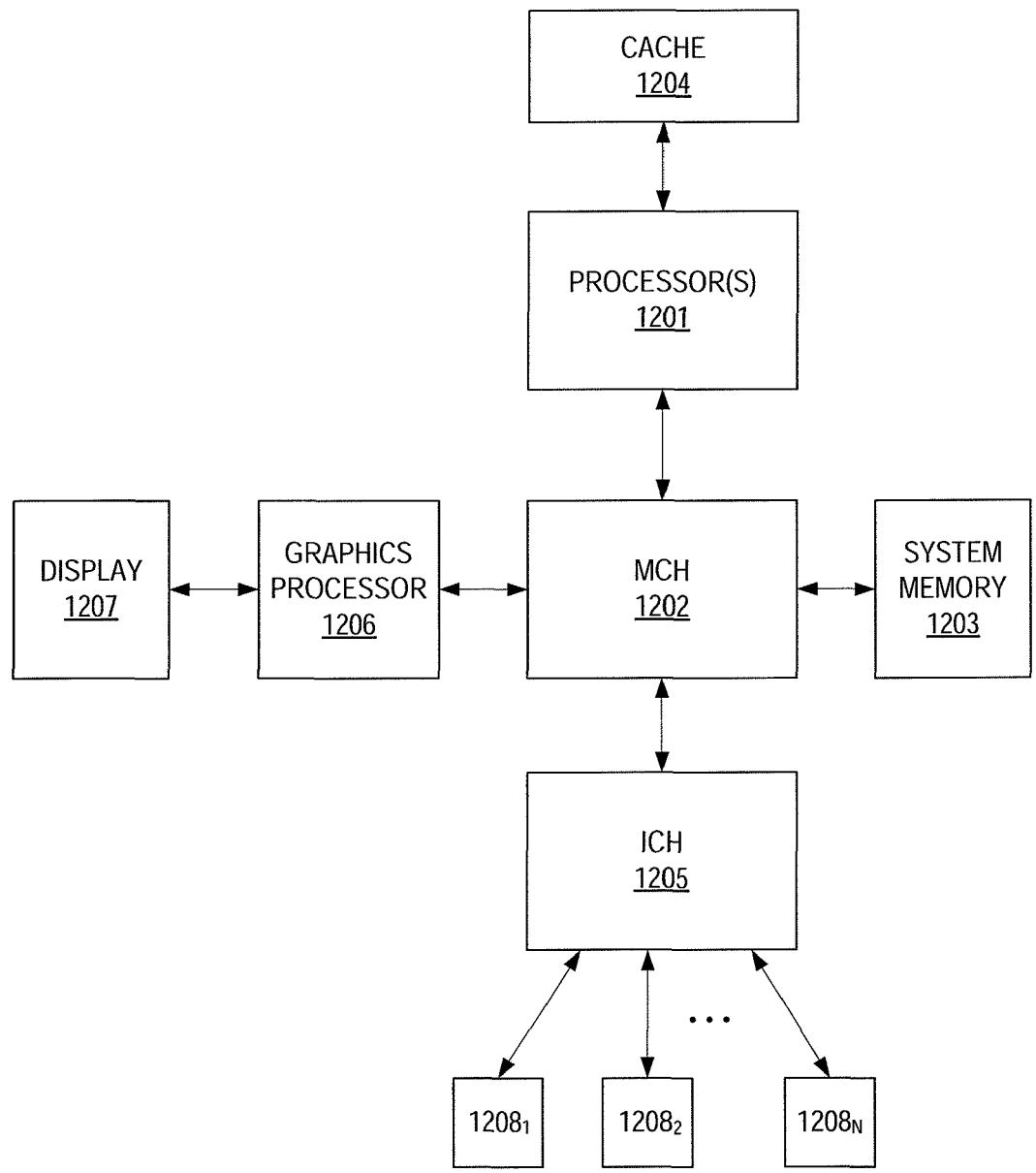
FIG. 12 shows an exemplary computer architecture 1200 for implementing the example system of FIG. 1 and the example methods of FIGS. 2-4, 7, and 9-10.

FIG. 12 shows an exemplary computer architecture 1200 for implementing the example system of FIG. 1 and the example methods of FIGS. 2-4, 7, and 9-10 described above. The exemplary computing system of FIG. 12 includes: 1) one or more processors 1201: 2) a memory control hub (MCH) 1202; 3) a system memory 1203 (of which different types exist such as DDR RAM, EDO RAM, etc,); 4) a cache 1204; 5) an I/O control hub (ICH) 1205: 6) a graphics processor 1206; 7) a display/screen 1207 (of which different types exist such as Cathode Ray Tube (CRT). Thin Film Transistor (TFT). Liquid Crystal Display (LCD), DPL, etc.; and/or 8) one or more I/O devices 1208.

The one or more processors 1201 execute instructions in order to perform whatever software routines the computing system implements. The instructions frequently involve some sort of operation performed upon data. Both data and instructions are stored in system memory 1203 and cache 1204. Cache 1204 is typically designed to have shorter latency times than system memory 1203. For example, cache 1204 might be integrated onto the same silicon chip(s) as the processor(s) and/or constructed with faster SRAM cells whilst system memory 1203 might be constructed with slower DRAM cells. By tending to store more frequently used instructions and data in the cache 1204 as opposed to the system memory 1203, the overall performance efficiency of the computing system improves.

System memory 1203 is deliberately made available to other components within the computing system. For example, the data received from various interfaces to the computing system (e.g., keyboard and mouse, printer port, LAN port, modem port, etc.) or retrieved from an internal storage element of the computing system (e.g., hard disk drive) are often temporarily queued into system memory 1203 prior to their being operated upon by the one or more processor(s) 1201 in the implementation of a software program. Similarly, data that a software program determines should be sent from the computing system to an outside entity through one of the computing system interfaces, or stored into an internal storage element, is often temporarily queued in system memory 1203 prior to its being transmitted or stored.

The ICH 1205 is responsible for ensuring that such data is properly passed between the system memory 1203 and its appropriate corresponding computing system interface (and internal storage device if the computing system is so designed). The MCH 1202 is responsible for managing the various contending requests for system memory 1203 access amongst the processor(s) 1201, interfaces and internal storage elements that may proximately arise in time with respect to one another.

One or more I/O devices 1208 are also implemented in a typical computing system. I/O devices generally are responsible for transferring data to and/or from the computing system (e.g., a networking adapter); or, for large scale non-volatile storage within the computing system (e.g., hard disk drive). ICH 1205 has bi-directional point-to-point links between itself and the observed I/O devices 1208.

General

Referring back to FIG. 1. modules of the different embodiments of the described system may include software, hardware, firmware, or any combination thereof. The modules may be software programs available to the public or special or general purpose processors running proprietary or public software. The software may also be specialized programs written specifically for image manipulation. For example, the sorting module 101 may be a comparator or other dedicated circuitry connected to a storage in order to store images whose camera settings match camera settings 102. In another example, the sorting module may be an application to compare camera settings and create a second plurality of images. The image filter creation module 104 may be dedicated circuitry receiving the second plurality of images and creating an image filter. The image filter creation module 104 may also be an application run on a general or dedicated processor, as shown in the example computer architecture 1200 (FIG. 12).

For the exemplary methods illustrated in FIGS. 2-4, 7, and 9-10, embodiments of the invention may include the various processes as set forth above. The processes may be embodied in machine-executable instructions which cause a general-purpose or special-purpose processor to perform certain steps. Alternatively, these processes may be performed by specific hardware components that contain hardwired logic for performing the processes, or by any combination of programmed computer components and custom hardware components. Furthermore, embodiments of the invention may not require all of the various processes presented, and it may be conceived by on skilled in the art as to how to practice the embodiments of the invention without specific processes presented or with extra processes not presented.

Elements of the present invention may also be provided as a machine-readable medium for storing the machine-executable instructions. The machine-readable medium may include, but is not limited to, floppy diskettes, optical disks, CD-ROMs, and magneto-optical disks, ROMs, RAMs. EPROMs, EEPROMs, flash, magnetic or optical cards, propagation media or other type of media/machine-readable medium suitable for storing electronic instructions.

The foregoing description of the embodiments of the invention has been presented only for the purpose of illustration and description and is not intended to be exhaustive or to limit the invention to the precise forms disclosed. Numerous modifications and adaptations are apparent to those skilled in the art without departing from the spirit and scope of the invention.

What is claimed is:

1. A computer implemented method, comprising:
   receiving a first plurality of images captured by at least one camera with a same setting as a first camera in the at least one camera, wherein the first camera is configured to capture a first image for which to create an image filter;
   creating an averaged image from the first plurality of captured images, wherein the averaged image comprises a measurement value of intensity for each pixel in the averaged image;
   determining an image imperfection in the averaged image; and
   creating the image filter to reduce the image imperfection.

2. The computer implemented method of claim 1, wherein the setting comprises:
a camera model;
an aperture size of the camera; and
a zoom setting of the camera.

3. The computer implemented method of claim 2, further comprising:
determining from a second plurality of images the first plurality of images, wherein determining from the second plurality of images the first plurality of images comprises for each image in the second plurality of images:
comparing the setting of the camera that captured each image to the setting of the first camera; and
determining the captured image is in the first plurality of images if the setting of the camera that captured the image matches the setting of the first camera.

4. The computer implemented method of claim 3, wherein the setting of the camera that captured each image is stored in a header of the captured image.

5. The computer implemented method of claim 4, wherein the captured image is in an Exchangeable Image File (EXIF) format.

6. The computer implemented method of claim 1, wherein the image imperfection is a bad pixel at a first position in the image, and further wherein determining the image imperfection comprises determining if the difference between a first measurement value of a pixel at the first position in the averaged image and a second measurement value of a neighboring pixel of the first position in the averaged image is above a predetermined threshold.

7. The computer implemented method of claim 6, wherein determining the image imperfection further comprises:
combining the second measurement value of the neighboring pixel with the measurement values of other neighboring pixels to create an averaged value; and
assigning the averaged value as the second measurement value of the neighboring pixel for determining the contrast between the first measurement value and the second measurement value.

8. The computer implemented method of claim 2, wherein:
the image imperfection is vignetting, further comprising determining the image imperfection comprises:
determining a vignetting profile of the first camera, wherein the vignetting profile is an output function of vignetting in relation to an input of distance from a center pixel of the averaged image to a measuring pixel of the averaged image for which a vignetting factor is to be computed; and
determining a corrected value of each pixel in the averaged image after correcting for vignetting multiplied by the vignetting factor approximately equals the measured value of the pixel in the averaged image.

9. The computer implemented method of claim 8, wherein a logarithm of the vignetting profile is a polynomial, wherein each monomial of the polynomial comprises a coefficient and a power of the distance between the center pixel and the measuring pixel.

10. The computer implemented method of claim 9, wherein determining the vignetting profile comprises determining the coefficients of the polynomial, and further comprising for each pixel of at least a portion of the averaged image:
determining the distance between the center pixel and the measuring pixel; and
replacing the corrected value of the measuring pixel with the measured value of the pixel horizontal to the measuring pixel and vertical to the center pixel of the averaged image.

11. The computer implemented method of claim 10, wherein determining the coefficients further comprises approximating the coefficients in order to reduce an error between an approximated corrected value for the measuring pixel in the averaged image and the corrected value for the measuring pixel, wherein the approximated corrected value of the measuring pixel is the measured value of the measuring pixel divided by an inverse logarithm of the output of the polynomial.

12. The computer implemented method of claim 11, wherein reducing the image imperfection comprises determining the approximated corrected value for each pixel of an at least portion of the first image.

13. A non-transitory computer-readable medium on which is encoded program code, comprising:
program code to receive a first plurality of images captured by at least one camera with a same setting as a first camera in the at least one camera, where the first camera is configured to capture a first image for which to create an image filter;
program code to create an averaged image from the first plurality of captured images, wherein the averaged image comprises a measurement value of intensity for each pixel in the averaged image;
program code to determine an image imperfection in the averaged image; and
program code to create the image filter to reduce the image imperfection.

14. The non-transitory computer-readable medium of claim 13, wherein the setting comprises:
a camera model;
an aperture size of the camera; and
a zoom setting of the camera.

15. The non-transitory computer-readable medium of claim 14, further comprising:
program code to determine from a second plurality of images the first plurality of images, wherein program code to determine from the second plurality of images the first plurality of images comprises for each image in the second plurality of images:
program code to compare the setting of the camera that captured each image to the setting of the first camera; and
program code to determine the captured image is in the first plurality of images if the setting of the camera that captured the image matches the setting of the first camera.

16. The non-transitory computer-readable medium of claim 15, wherein the setting of the camera that captured each image is stored in a header of the captured image.

17. The non-transitory computer-readable medium of claim 16, wherein the captured image is in an Exchangeable Image File (EXIF) format.

18. The non-transitory computer-readable medium of claim 13, wherein the image imperfection is a bad pixel at a first position in the image, and further wherein program code to determine the image imperfection comprises program code to determine if the difference between a first measurement value of a pixel at the first position in the averaged image and a second measurement value of a neighboring pixel of the first position in the averaged image is above a predetermined threshold.

19. The non-transitory computer-readable medium of claim 18, wherein program code to determine the image imperfection further comprises:
- program code to combine the second measurement value of the neighboring pixel with the measurement values of other neighboring pixels to create an averaged value; and
- program code to assign the averaged value as the second measurement value of the neighboring pixel for determining the contrast between the first measurement value and the second measurement value.

20. The non-transitory computer-readable medium of claim 14, wherein the image imperfection is vignetting, further comprising program code to determine the image imperfection comprises:
- program code to determine a vignetting profile of the first camera, wherein the vignetting profile is an output function of vignetting in relation to an input of distance from a center pixel of the averaged image to a measuring pixel of the averaged image for which a vignetting factor is to be computed; and
- program code to determine a corrected value of each pixel in the averaged image after correcting for vignetting multiplied by the vignetting factor approximately equals the measured value of the pixel in the averaged image.

21. The non-transitory computer-readable medium of claim 20, wherein a logarithm of the vignetting profile is a polynomial, wherein each monomial of the polynomial comprises a coefficient and a power of the distance between the center pixel and the measuring pixel.

22. The non-transitory computer-readable medium of claim 21, wherein program code to determine the vignetting profile comprises program code to determine the coefficients of the polynomial, comprising for each pixel of at least a portion of the averaged image:
- program code to determine the distance between the center pixel and the measuring pixel; and
- program code to replace the corrected value of the measuring pixel with the measured value of the pixel horizontal to the measuring pixel and vertical to the center pixel of the averaged image.

23. The non-transitory computer-readable medium of claim 22, wherein:
- program code to determine the coefficients further comprises program code to approximate the coefficients in order to reduce an error between an approximated corrected value for the measuring pixel in the averaged image and the corrected value for the measuring pixel, wherein the approximated corrected value of the measuring pixel is the measured value of the measuring pixel divided by an inverse logarithm of the output of the polynomial; and
- program code to reduce the image imperfection comprises program code to determine the approximated corrected value for each pixel of an at least portion of the first image.

24. A system for creating an image filter for a first image from a first camera, comprising:
- a sorting module to:
  - compare the setting of a camera that captured each image in a second plurality of images to the setting of the first camera; and
  - determine the captured image is in a first plurality of images for each image in the second plurality of images if a setting of the camera that captured the image matches the setting of the first camera;
- an image filter creation module to:
  - create an averaged image from the first plurality of images, wherein the averaged image comprises a measurement value of intensity for each pixel in the averaged image;
  - determine vignetting in the averaged image, wherein determining vignetting in the averaged image comprises determining a vignetting profile of the first camera, wherein:
    - the vignetting profile is an output function of vignetting in relation to an input of distance from a center pixel of the averaged image to a measuring pixel of the averaged image for which a vignetting factor is to be computed;
    - a corrected value of each pixel in the averaged image after correcting for vignetting multiplied by the vignetting factor approximately equals the measured value of the pixel in the averaged image; and
    - approximating the vignetting profile in order to reduce an error between an approximated corrected value for the measuring pixel in the averaged image and the corrected value for the measuring pixel, wherein the approximated corrected value of the measuring pixel is the measured value of the measuring pixel divided by the output of the vignetting profile for the measuring pixel; and
  - create the image filter to reduce vignetting by determining the approximated corrected value for each pixel of an at least portion of the first image.

25. A computer implemented method for creating an image filter for a first image from a first camera, comprising:
- receiving a plurality of images, wherein each image of the plurality of images is captured by a camera that matches a setting of the first camera;
- creating an averaged image from the plurality of images, wherein the averaged image comprises a measurement value of intensity for each pixel in the averaged image;
- determining vignetting in the averaged image, comprising:
- determining a vignetting profile of the first camera, wherein the vignetting profile is an output function of vignetting in relation to an input of distance from a center pixel of the averaged image to a measuring pixel of the averaged image for which a vignetting factor is to be computed;
- determining a corrected value of each pixel in the averaged image after correcting for vignetting multiplied by the vignetting factor approximately equals the measured value of the pixel in the averaged image; and
- approximating the vignetting profile in order to reduce an error between an approximated corrected value for the measuring pixel in the averaged image and the corrected value for the measuring pixel, wherein the approximated corrected value of the measuring pixel is the measured value of the measuring pixel divided by the output of the vignetting profile for the measuring pixel; and
- creating the image filter by determining the approximated corrected value for each pixel of an at least portion of the first image.

26. A method comprising:
- receiving by a processor a first image;
- receiving by a processor a second image, the first image and the second image having a same image setting;
- creating by a processor a third image based at least in part on the first image and the second image;
- determining by a processor an image imperfection in the third image;

creating by a processor an image filter based at least in part on the image imperfection, the image filter configured to reduce the image imperfection.

27. A method comprising:

receiving by a processor an image profile, the image profile based at least in part on a camera setting;

receiving by a processor a first plurality of images, each image in the first plurality of images having image settings based at least in part on camera settings when the image was taken;

determining by a processor a second plurality of images, the second plurality of images being a subset of the first plurality of images, each image in the second plurality of images having image settings that correspond with the image profile;

creating by a processor an averaged image from the second plurality of images;

determining by a processor an image imperfection in the averaged image;

creating by a processor an image filter based at least in part on the image imperfection, the image filter configured to reduce the image imperfection.

* * * * *

UNITED STATES PATENT AND TRADEMARK OFFICE
CERTIFICATE OF CORRECTION

| | | |
|---|---|---|
| PATENT NO. | : 8,103,121 B2 | Page 1 of 1 |
| APPLICATION NO. | : 11/944056 | |
| DATED | : January 24, 2012 | |
| INVENTOR(S) | : Agarwala et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1097 days.

Signed and Sealed this
Tenth Day of April, 2012

David J. Kappos
*Director of the United States Patent and Trademark Office*